US009900299B2

(12) United States Patent
Oppenheim, Jr. et al.

(10) Patent No.: US 9,900,299 B2
(45) Date of Patent: Feb. 20, 2018

(54) AGGREGATED COMPUTING INFRASTRUCTURE ANALYZER

(71) Applicant: Oracle International Corporation, Redwood Shores, CA (US)

(72) Inventors: Andrew Balt Oppenheim, Jr., Colorado Springs, CO (US); Charles Stephen Melville, Boulder, CO (US); Nayan Patel, Greeneville, TN (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 322 days.

(21) Appl. No.: 14/678,434

(22) Filed: Apr. 3, 2015

(65) Prior Publication Data

US 2016/0294800 A1 Oct. 6, 2016

(51) Int. Cl.
*H04L 29/06* (2006.01)
*G06F 17/30* (2006.01)

(52) U.S. Cl.
CPC ........ *H04L 63/08* (2013.01); *G06F 17/30477* (2013.01); *G06F 17/30589* (2013.01); *H04L 63/1433* (2013.01); *H04L 63/20* (2013.01)

(58) Field of Classification Search
None
See application file for complete search history.

(56) References Cited

U.S. PATENT DOCUMENTS

2007/0180490 A1* 8/2007 Renzi .................. G06F 21/577
726/1

2008/0052101 A1* 2/2008 Ziade .................. G06Q 40/08
705/4

(Continued)

OTHER PUBLICATIONS

Gandhi, R.A.; Lee, S.W. Discovering Multidimensional Correlations among Regulatory Requirements to Understand Risk. ACM Transactions on Software Engineering and Methodology. vol. 20, Issue: 4. Pub. Date: 2011. https://dl.acm.org/citation.cfm?id=2000802.*

(Continued)

*Primary Examiner* — Jeremiah Avery
(74) *Attorney, Agent, or Firm* — Kilpatrick Townsend & Stockton LLP

(57) ABSTRACT

Embodiments of the invention provide techniques for receiving, authenticating, parsing, and storing operational status data (or telemetry data) from one or more hardware and software systems within an aggregated computing infrastructure. Operational status data may be transmitted over secure transmission channels and stored within secure data stores at a computing infrastructure analyzer. Additionally, some embodiments describe techniques for creating, storing, and retrieving operational risk rules that may apply to one or more computing infrastructures. Based on the operational risk rules, one or more determinations may be performed to identify data items for extraction from the received telemetry data of an aggregated computing infrastructure. Using the extracted telemetry data items, one or more operational risk rules may be evaluated with respect to the aggregated computing infrastructure. Based on the evaluation of operational risk rules, one or more operational risk items and/or operational risk values may be determined for the aggregated computing infrastructure.

20 Claims, 10 Drawing Sheets

(56) References Cited

U.S. PATENT DOCUMENTS

| | | | | |
|---|---|---|---|---|
| 2008/0288405 A1* | 11/2008 | John | ................... | G06Q 20/40 705/44 |
| 2011/0154498 A1* | 6/2011 | Fissel | ................ | H04L 63/1433 726/25 |
| 2014/0164519 A1* | 6/2014 | Shah | ................... | H04L 67/306 709/204 |
| 2014/0278730 A1* | 9/2014 | Muhart | ............. | G06Q 10/0635 705/7.28 |
| 2015/0249685 A1* | 9/2015 | Crane | .................. | H04L 63/20 726/1 |
| 2015/0356477 A1* | 12/2015 | Milkman | .......... | G06Q 10/0633 705/7.27 |

OTHER PUBLICATIONS

Breier, Jakub; Hudec, Ladislav. Risk analysis supported by information security metrics. Proceedings of the 12th International Conference on Computer Systems and Technologies. CompSysTech '11. pp. 393-398. Pub. Date: 2011. https://dl.acm.org/citation.cfm?id=2023673.*

* cited by examiner

Operational Risk Rules For Computing Infrastructures

| Rule ID | Rule Criteria | Probability | Severity | Description / Remedy |
|---|---|---|---|---|
| RuleID_0001 | OS=aaa; UserApp=bbb; SrvcPack=ccc; SWPatch=ddd; ... | 0.95 | 3.0 | ... |
| RuleID_0002 | SrvDeviceModel=aaa; DeviceSetting=bbb; ErrorLog=ccc; ... | 0.60 | 5.5 | ... |
| RuleID_0003 | OSType=aaa; MW_App=bbb; UserApp=ccc; #VMs=ddd | 0.20 | 7.5 | ... |
| RuleID_0004 | StorageArray=aaa; #HDDs=bbb; PowerCordType=ccc; | 0.02 | 9.0 | ... |
| RuleID_0005 | StorageDeviceModel=aaa; NWType=bbb; UserApp=ccc; ... | 0.50 | 2.5 | ... |
| ... | ... | ... | ... | ... |

FIG. 7A

Operational Risk Issues for Aggregated Computing Infrastructure

| System ID | Rule ID | Operational Risk Issue Description | Risk Issue Score |
|---|---|---|---|
| serv_021 | RuleID_0002 | Hardware Failure - CPU(s) offline | 3.0 |
| Vm_Serv01 | RuleID_0009 | System software patch id=xxxxx needed. | 9.0 |
| App_Serv008 | RuleID_0003 | Application CCC - Critical alert / Memory Leak | 6.5 |
| ... | ... | ... | ... |

Operational Risk Dashboard Summary

| Assets | |
|---|---|
| Assets | 7 |
| Assets with hostid | 7 |
| Assets with Explorer data | 7 |
| Assets with RDA data | 0 |

| Alerts | |
|---|---|
| Solaris Alerts Applicable to ACME Widgets | 45 |
| Linux Alerts Applicable to ACME Widgets | 0 |

| Collected Data | |
|---|---|
| Explorers in Oracle database | 7 |
| Explorers less than 1 month old | 0 |
| Explorers more than 1 month old | 7 |
| Hostids with Expired Explorers | 0 |

| Operational Risk Index | |
|---|---|
| Hosts Analyzed | 7 |
| Average ORI for all hosts | 96 |
| Average ORI for MC hosts | 131 |
| Best System ORI | 42 |
| Worst System ORI | 302 |

| System Hardware Faults | |
|---|---|
| CPU Failures | 0 |
| Memory Failures | 0 |
| I/O Card Failures | 0 |
| Environment Failures | 0 |
| Alom Reported Failures | 0 |
| Disk Failures | 5 |

FIG. 9A

OPERATIONAL RISK ANALYSIS FOR ALL SYSTEMS

| Host Name | Host ID | Type | Date | Critical | High | Medium | Low | ORI |
|---|---|---|---|---|---|---|---|---|
| ssd002a | 85a61786 | Sun SPARC Enterprise T5220 Server | 20-05-2014 | 47 | 16 | 12 | 5 | 591 |
| OSDG3A | 84e890c2 | Sun SPARC Enterprise T5220 Server | 20-05-2014 | 46 | 16 | 12 | 5 | 581 |
| sbbrtsvr575 | 84d4ff1c | Sun SPARC Enterprise T5220 Server | 21-03-2014 | 13 | 3 | 12 | 2 | 183 |
| sbtorsvr237 | 837d6461 | Sun Fire E2900 Server | 21-03-2014 | 11 | 3 | 9 | 1 | 153 |
| bodpoe2 | 85bbc3c0 | SPARC T3-1 Server | 10-11-2012 | 6 | 5 | 3 | 0 | 94 |
| OSDG1A | 84a036ec | Sun SPARC Enterprise T5220 Server | 20-05-2014 | 4 | 0 | 2 | 0 | 46 |

FIG. 9B

AGGREGATED COMPUTING INFRASTRUCTURE ANALYZER

BACKGROUND

Complex computing infrastructures are often the lifeblood of businesses, educational institutions, governmental agencies, and the like. These computing infrastructures, also referred to as computing environments or computing systems, may be required to support the needs of the organization at the hardware level, to provide internal and external networking needs, to support various software capabilities for end users and administrators, and/or provide back-end data storage solutions. For such computing infrastructures to be effective and useful to an organization, they must provide all of these capabilities in a secure, reliable, stable, and scalable computing environment that offers a high level of performance for users inside and outside of the organization.

Performance and stability of a computing infrastructure may depend on the ability for operational risks and issues within the various systems of the computing infrastructure to be identified and addressed. However, many complex computing infrastructures may contain multiple interactive but separate hardware systems and software systems, for example, storage devices, computer servers, virtual machine servers, operating systems, database servers, middleware applications, and/or user software applications. Aggregated computing infrastructures containing one or more of such systems may produce large amounts of operational status data from each individual system and/or the computing infrastructure as a whole. Moreover, the interactions and effects caused by interrelating systems within a computing infrastructures may be complex and difficult to analyze.

BRIEF SUMMARY

Embodiments of the invention provide techniques for evaluating operational risk rules based on the extracted operational status data for an aggregated computing infrastructure. More specifically, certain embodiments of the present invention describe techniques for receiving, authenticating, parsing, and storing operational status data (or telemetry data) from one or more hardware and software systems within an aggregated computing infrastructure. Operational status data may be transmitted over secure transmission channels and stored within secure data stores at a computing infrastructure analyzer. Additionally, some embodiments describe techniques for creating, storing, and retrieving operational risk rules that may apply to one or more computing infrastructures. Based on the operational risk rules, one or more determinations may be performed to identify data items for extraction from the received telemetry data of an aggregated computing infrastructure. Using the extracted telemetry data items, one or more operational risk rules may be evaluated with respect to the aggregated computing infrastructure. Based on the evaluation of operational risk rules, one or more operational risk items and/or operational risk values may be determined for the aggregated computing infrastructure.

In some embodiments, client devices may transmit requests for operational risk analyses and reports for various hardware and/or software systems within an aggregated computing infrastructure. Such requests may be received and authenticated via a reporting interface provided by a computing infrastructure analyzer. In some embodiments, users may be authorized to request operational risk analyses and reports only for certain specified computing infrastructures and/or certain specified hardware systems and software systems within an aggregated computing infrastructure. Additionally, certain users may be authorized to request only certain types of operational risk data. A report generation engine may perform the operational risk analyses and generate operational risk reports to be transmitted for transmission to client devices. Such operational risk reports may include various combinations of operational risk issue data, operational risk rule data, and/or telemetry data corresponding to hardware and software systems within a computing infrastructure. Operational risk analyses and reports may include descriptions of current operational risk issues, aggregations and prioritizations of risk issues for various systems, calculations of severity and probability, and remedial information and recommendations relating to the operational risk issues.

BRIEF DESCRIPTION OF THE DRAWINGS

FIGS. 7A and 7B are illustrative tables respectively showing various examples of operational risk rules and operational risk issues, according to one or more embodiments of the present invention.

FIGS. 9A and 9B are illustrative operational risk reports relating to an aggregated computing infrastructure, according to one or more embodiments of the present invention.

DETAILED DESCRIPTION

Figure 1:
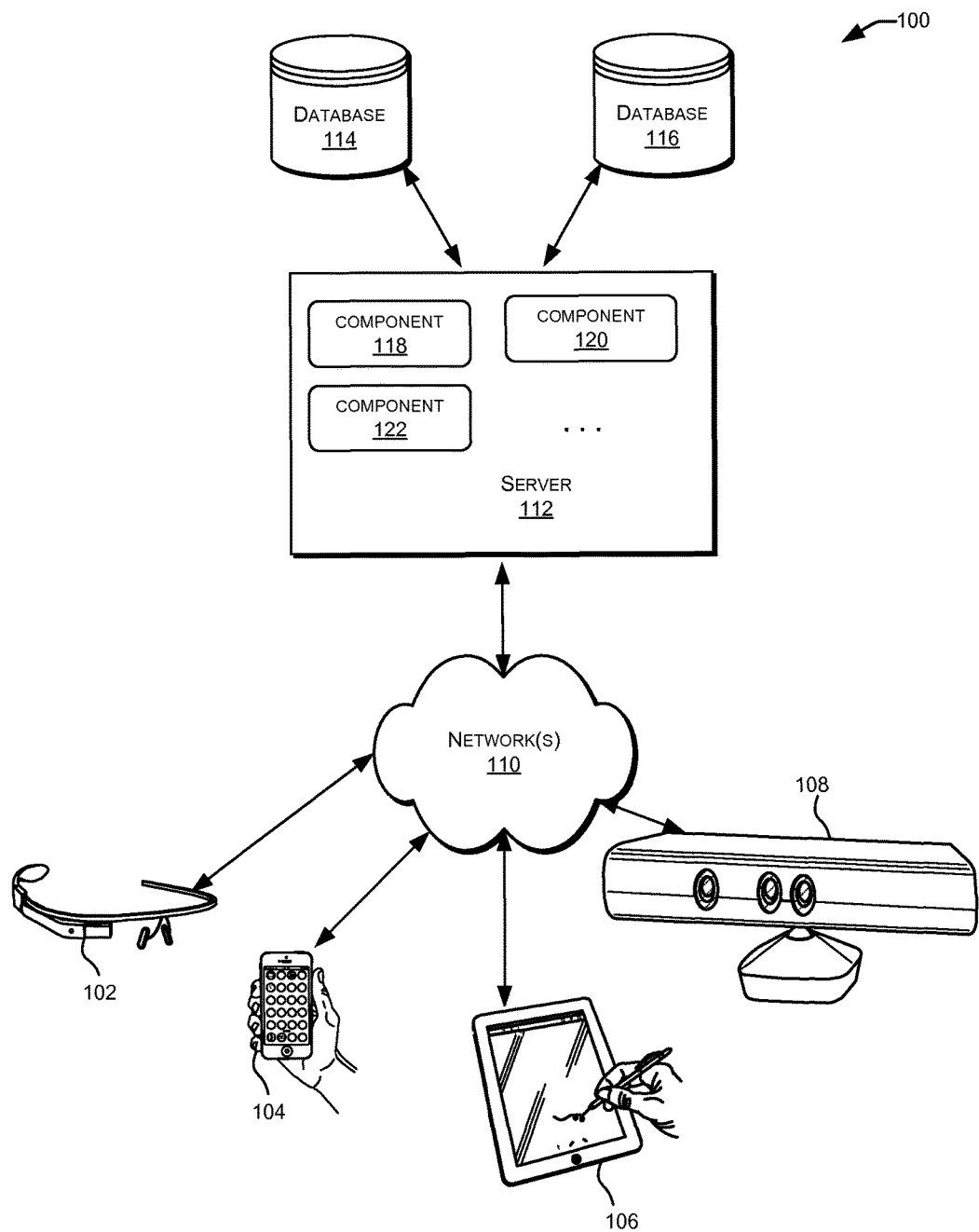
FIG. 1 is a block diagram illustrating components of an exemplary distributed system in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited non-transitory media such as portable or fixed storage devices, optical storage devices, and various other mediums capable of storing, containing or carrying instruction(s) and/or data. A code segment or computer-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various techniques (e.g., methods, systems, non-transitory computer-readable storage memory storing a plurality of instructions executable by one or more processors, etc.) are described herein for evaluating operational risk rules based on the extracted operational status data for an aggregated computing infrastructure. More specifically, certain embodiments of the present invention describe techniques for receiving, authenticating, parsing, and storing operational status data (or telemetry data) from one or more hardware and software systems within an aggregated computing infrastructure. Operational status data may be transmitted over secure transmission channels and stored within secure data stores at a computing infrastructure analyzer. Additionally, some embodiments describe techniques for creating, storing, and retrieving operational risk rules that may apply to one or more computing infrastructures. Based on the operational risk rules, one or more determinations may be performed to identify data items for extraction from the received telemetry data of an aggregated computing infrastructure. Using the extracted telemetry data items, one or more operational risk rules may be evaluated with respect to the aggregated computing infrastructure. Based on the evaluation of operational risk rules, one or more operational risk items and/or operational risk values may be determined for the aggregated computing infrastructure.

Additionally, in some embodiments, client devices may transmit requests for operational risk analyses and reports for various hardware and/or software systems within an aggregated computing infrastructure. Such requests may be received and authenticated via a reporting interface provided by a computing infrastructure analyzer. In some embodiments, users may be authorized to request operational risk analyses and reports only for certain specified computing infrastructures and/or certain specified hardware systems and software systems within an aggregated computing infrastructure. Additionally, certain users may be authorized to request only certain types of operational risk data. A report generation engine may perform the operational risk analyses and generate operational risk reports to be transmitted for transmission to client devices. Such operational risk reports may include various combinations of operational risk issue data, operational risk rule data, and/or telemetry data corresponding to hardware and software systems within a computing infrastructure. Operational risk analyses and reports may include descriptions of current operational risk issues, aggregations and prioritizations of risk issues for various systems, calculations of severity and probability, and remedial information and recommendations relating to the operational risk issues.

FIG. 1 is a block diagram illustrating components of an exemplary distributed system in which various embodiments of the present invention may be implemented. In the illustrated embodiment, distributed system 100 includes one or more client computing devices 102, 104, 106, and 108, which are configured to execute and operate a client application such as a web browser, proprietary client (e.g., Oracle Forms), or the like over one or more network(s) 110. Server 112 may be communicatively coupled with remote client computing devices 102, 104, 106, and 108 via network 110.

In various embodiments, server 112 may be adapted to run one or more services or software applications provided by one or more of the components of the system. In some embodiments, these services may be offered as web-based or cloud services or under a Software as a Service (SaaS) model to the users of client computing devices 102, 104, 106, and/or 108. Users operating client computing devices 102, 104, 106, and/or 108 may in turn utilize one or more client applications to interact with server 112 to utilize the services provided by these components.

In the configuration depicted in the figure, the software components 118, 120 and 122 of system 100 are shown as being implemented on server 112. In other embodiments, one or more of the components of system 100 and/or the services provided by these components may also be implemented by one or more of the client computing devices 102, 104, 106, and/or 108. Users operating the client computing devices may then utilize one or more client applications to use the services provided by these components. These components may be implemented in hardware, firmware, software, or combinations thereof. It should be appreciated that various different system configurations are possible, which may be different from distributed system 100. The embodiment shown in the figure is thus one example of a distributed system for implementing an embodiment system and is not intended to be limiting.

Client computing devices 102, 104, 106, and/or 108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 102, 104, 106, and 108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 110.

Although exemplary distributed system 100 is shown with four client computing devices, any number of client computing devices may be supported. Other devices, such as devices with sensors, etc., may interact with server 112.

Network(s) 110 in distributed system 100 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 110 can be a local area network (LAN), such as one based on Ethernet, Token-Ring and/or the like. Network(s) 110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 112 may be adapted to run one or more services or software applications described in the foregoing disclosure. For example, server 112 may correspond to a server for performing processing described above according to an embodiment of the present disclosure.

Server 112 may run an operating system including any of those discussed above, as well as any commercially available server operating system. Server 112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 112 may include one or more applications to analyze and consolidate data feeds and/or event updates received from users of client computing devices 102, 104, 106, and 108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 112 may also include one or more applications to display the data feeds and/or real-time events via one or more display devices of client computing devices 102, 104, 106, and 108.

Distributed system 100 may also include one or more databases 114 and 116. Databases 114 and 116 may reside in a variety of locations. By way of example, one or more of databases 114 and 116 may reside on a non-transitory storage medium local to (and/or resident in) server 112. Alternatively, databases 114 and 116 may be remote from server 112 and in communication with server 112 via a network-based or dedicated connection. In one set of embodiments, databases 114 and 116 may reside in a storage-area network (SAN). Similarly, any necessary files for performing the functions attributed to server 112 may be stored locally on server 112 and/or remotely, as appropriate. In one set of embodiments, databases 114 and 116 may include relational databases, such as databases provided by Oracle, that are adapted to store, update, and retrieve data in response to SQL-formatted commands.

Figure 2:
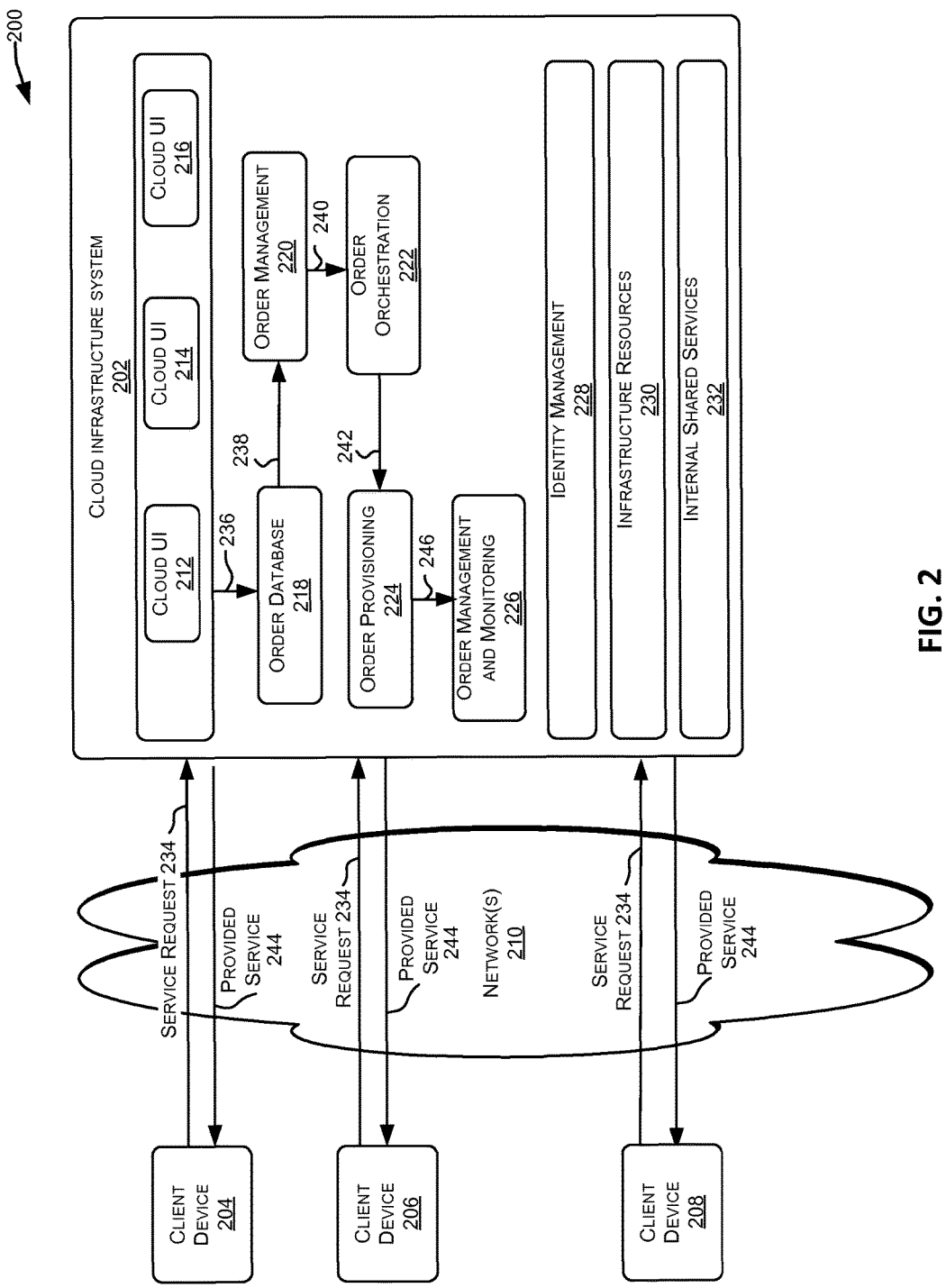
FIG. 2 is a block diagram illustrating components of a system environment by which services provided by embodiments of the present invention may be offered as cloud services.

FIG. 2 is a block diagram illustrating components of a system environment by which services provided by embodiments of the present invention may be offered as cloud services. In the illustrated embodiment, system environment 200 includes one or more client computing devices 204, 206, and 208 that may be used by users to interact with a cloud infrastructure system 202 that provides cloud services. The client computing devices may be configured to operate a client application such as a web browser, a proprietary client application (e.g., Oracle Forms), or some other application, which may be used by a user of the client computing device to interact with cloud infrastructure system 202 to use services provided by cloud infrastructure system 202.

It should be appreciated that cloud infrastructure system 202 depicted in the figure may have other components than those depicted. Further, the embodiment shown in the figure is only one example of a cloud infrastructure system that may incorporate an embodiment of the invention. In some other embodiments, cloud infrastructure system 202 may have more or fewer components than shown in the figure, may combine two or more components, or may have a different configuration or arrangement of components.

Client computing devices 204, 206, and 208 may be devices similar to those described above for 102, 104, 106, and 108.

Although exemplary system environment 200 is shown with three client computing devices, any number of client computing devices may be supported. Other devices such as devices with sensors, etc. may interact with cloud infrastructure system 202.

Network(s) 210 may facilitate communications and exchange of data between clients 204, 206, and 208 and cloud infrastructure system 202. Each network may be any type of network familiar to those skilled in the art that can support data communications using any of a variety of commercially-available protocols, including those described above for network(s) 110.

Cloud infrastructure system 202 may comprise one or more computers and/or servers that may include those described above for server 112.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 202 may be adapted to automatically provision, manage and track a customer's subscription to services offered by cloud infrastructure system 202. Cloud infrastructure system 202 may provide the cloud services via different deployment models. For example, services may be provided under a public cloud model in which cloud infrastructure system 202 is owned by an organization selling cloud services (e.g., owned by Oracle) and the services are made available to the general public or different industry enterprises. As another example, services may be provided under a private cloud model in which cloud infrastructure system 202 is operated solely for a single organization and may provide services for one or more entities within the organization. The cloud services may also be provided under a community cloud model in which cloud infrastructure system 202 and the services provided by cloud infrastructure system 202 are shared by several organizations in a related community. The cloud services may also be provided under a hybrid cloud model, which is a combination of two or more different models.

In some embodiments, the services provided by cloud infrastructure system 202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 202. Cloud infrastructure system 202 then performs processing to provide the services in the customer's subscription order.

In some embodiments, the services provided by cloud infrastructure system 202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 202 may also include infrastructure resources 230 for providing the resources used to provide various services to customers of the cloud infrastructure system. In one embodiment, infrastructure resources 230 may include pre-integrated and optimized combinations of hardware, such as servers, storage, and networking resources to execute the services provided by the PaaS platform and the SaaS platform.

In some embodiments, resources in cloud infrastructure system 202 may be shared by multiple users and dynamically re-allocated per demand. Additionally, resources may be allocated to users in different time zones. For example, cloud infrastructure system 230 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 232 may be provided that are shared by different components or modules of cloud infrastructure system 202 and by the services provided by cloud infrastructure system 202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 202 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 202, and the like.

In one embodiment, as depicted in the figure, cloud management functionality may be provided by one or more modules, such as an order management module 220, an order orchestration module 222, an order provisioning module 224, an order management and monitoring module 226, and an identity management module 228. These modules may include or be provided using one or more computers and/or servers, which may be general purpose computers, specialized server computers, server farms, server clusters, or any other appropriate arrangement and/or combination.

In exemplary operation 234, a customer using a client device, such as client device 204, 206 or 208, may interact with cloud infrastructure system 202 by requesting one or more services provided by cloud infrastructure system 202 and placing an order for a subscription for one or more services offered by cloud infrastructure system 202. In certain embodiments, the customer may access a cloud User Interface (UI), cloud UI 212, cloud UI 214 and/or cloud UI 216 and place a subscription order via these UIs. The order information received by cloud infrastructure system 202 in response to the customer placing an order may include information identifying the customer and one or more services offered by the cloud infrastructure system 202 that the customer intends to subscribe to.

After an order has been placed by the customer, the order information is received via the cloud UIs, 212, 214 and/or 216.

At operation 236, the order is stored in order database 218. Order database 218 can be one of several databases operated by cloud infrastructure system 218 and operated in conjunction with other system elements.

At operation 238, the order information is forwarded to an order management module 220. In some instances, order management module 220 may be configured to perform billing and accounting functions related to the order, such as verifying the order, and upon verification, booking the order.

At operation 240, information regarding the order is communicated to an order orchestration module 222. Order orchestration module 222 may utilize the order information to orchestrate the provisioning of services and resources for the order placed by the customer. In some instances, order orchestration module 222 may orchestrate the provisioning of resources to support the subscribed services using the services of order provisioning module 224.

In certain embodiments, order orchestration module 222 enables the management of business processes associated with each order and applies business logic to determine whether an order should proceed to provisioning. At operation 242, upon receiving an order for a new subscription, order orchestration module 222 sends a request to order provisioning module 224 to allocate resources and configure those resources needed to fulfill the subscription order. Order provisioning module 224 enables the allocation of resources for the services ordered by the customer. Order provisioning module 224 provides a level of abstraction between the cloud services provided by cloud infrastructure system 200 and the physical implementation layer that is used to provision the resources for providing the requested services. Order orchestration module 222 may thus be isolated from implementation details, such as whether or not services and resources are actually provisioned on the fly or pre-provisioned and only allocated/assigned upon request.

At operation 244, once the services and resources are provisioned, a notification of the provided service may be sent to customers on client devices 204, 206 and/or 208 by order provisioning module 224 of cloud infrastructure system 202.

At operation 246, the customer's subscription order may be managed and tracked by an order management and monitoring module 226. In some instances, order management and monitoring module 226 may be configured to collect usage statistics for the services in the subscription order, such as the amount of storage used, the amount data transferred, the number of users, and the amount of system up time and system down time.

In certain embodiments, cloud infrastructure system 200 may include an identity management module 228. Identity management module 228 may be configured to provide identity services, such as access management and authorization services in cloud infrastructure system 200. In some embodiments, identity management module 228 may control information about customers who wish to utilize the services provided by cloud infrastructure system 202. Such information can include information that authenticates the identities of such customers and information that describes which actions those customers are authorized to perform relative to various system resources (e.g., files, directories, applications, communication ports, memory segments, etc.)

Identity management module 228 may also include the management of descriptive information about each customer and about how and by whom that descriptive information can be accessed and modified.

Figure 3:
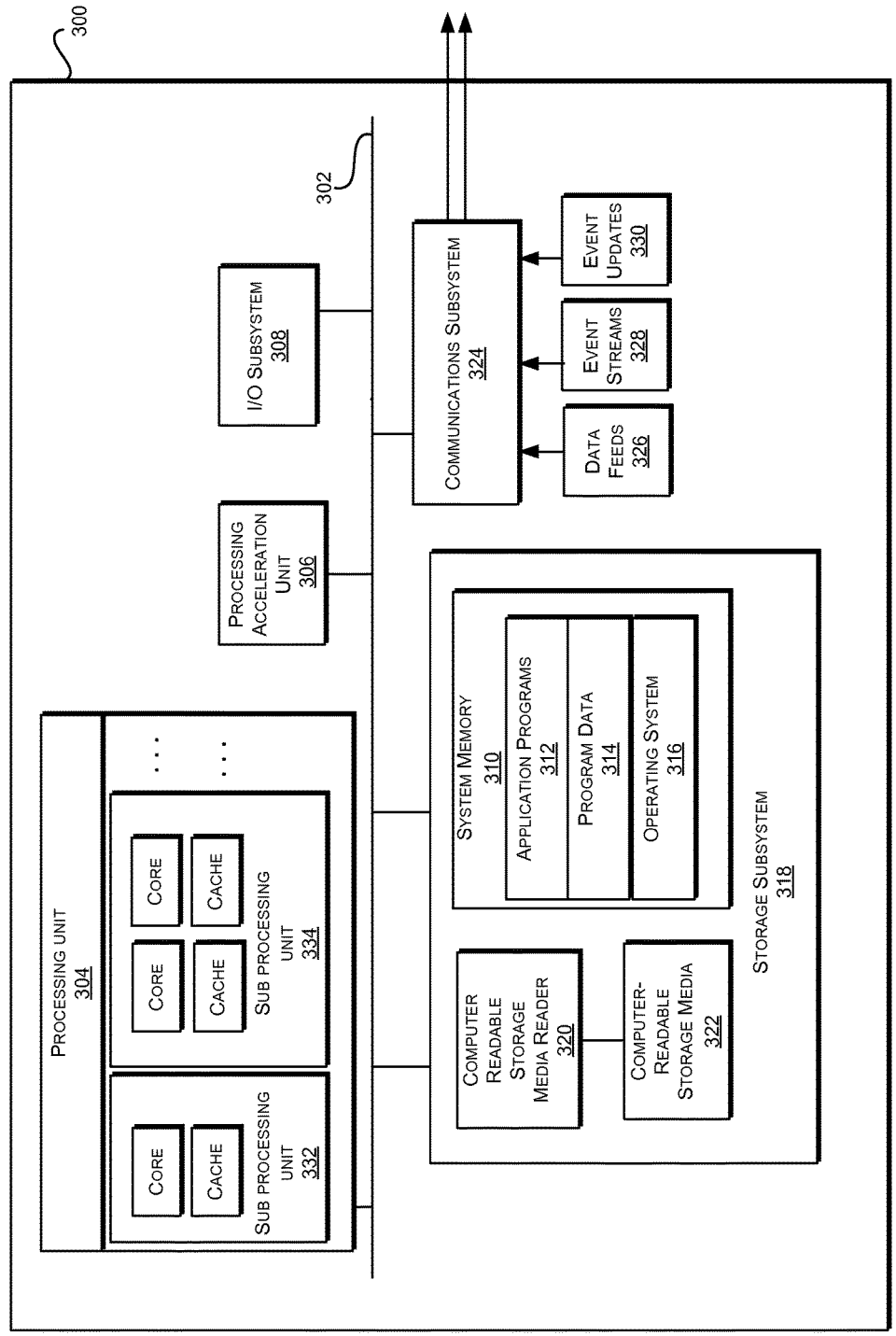
FIG. 3 is a block diagram illustrating an exemplary computer system in which embodiments of the present invention may be implemented.

FIG. 3 is a block diagram illustrating an exemplary computer system in which embodiments of the present invention may be implemented. The system 300 may be used to implement any of the computer systems described above. As shown in the figure, computer system 300 includes a processing unit 304 that communicates with a number of peripheral subsystems via a bus subsystem 302. These peripheral subsystems may include a processing acceleration unit 306, an I/O subsystem 308, a storage subsystem 318 and a communications subsystem 324. Storage subsystem 318 includes tangible computer-readable storage media 322 and a system memory 310.

Bus subsystem 302 provides a mechanism for letting the various components and subsystems of computer system 300 communicate with each other as intended. Although bus subsystem 302 is shown schematically as a single bus, alternative embodiments of the bus subsystem may utilize multiple buses. Bus subsystem 302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 304, which can be implemented as one or more integrated circuits (e.g., a conventional microprocessor or microcontroller), controls the operation of computer system 300. One or more processors may be included in processing unit 304. These processors may include single core or multicore processors. In certain embodiments, processing unit 304 may be implemented as one or more independent processing units 332 and/or 334 with single or multicore processors included in each processing unit. In other embodiments, processing unit 304 may also be implemented as a quad-core processing unit formed by integrating two dual-core processors into a single chip.

In various embodiments, processing unit 304 can execute a variety of programs in response to program code and can maintain multiple concurrently executing programs or processes. At any given time, some or all of the program code to be executed can be resident in processor(s) 304 and/or in storage subsystem 318. Through suitable programming, processor(s) 304 can provide various functionalities described above. Computer system 300 may additionally include a processing acceleration unit 306, which can include a digital signal processor (DSP), a special-purpose processor, and/or the like.

I/O subsystem 308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 300 may comprise a storage subsystem 318 that comprises software elements, shown as being currently located within a system memory 310. System memory 310 may store program instructions that are loadable and executable on processing unit 304, as well as data generated during the execution of these programs.

Depending on the configuration and type of computer system 300, system memory 310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 304. In some implementations, system memory 310 may include multiple different types of memory, such as static random access memory (SRAM) or dynamic random access memory (DRAM). In some implementations, a basic input/output system (BIOS), containing the basic routines that help to transfer information between elements within computer system 300, such as during start-up, may typically be stored in the ROM. By way of example, and not limitation, system memory 310 also illustrates application programs 312, which may include client applications, Web browsers, mid-tier applications, relational database management systems (RDBMS), etc., program data 314, and an operating system 316. By way of example, operating system 316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 318 may also provide a tangible computer-readable storage medium for storing the basic programming and data constructs that provide the functionality of some embodiments. Software (programs, code modules, instructions) that when executed by a processor provide the functionality described above may be stored in storage subsystem 318. These software modules or instructions may be executed by processing unit 304. Storage subsystem 318 may also provide a repository for storing data used in accordance with the present invention.

Storage subsystem 300 may also include a computer-readable storage media reader 320 that can further be connected to computer-readable storage media 322. Together and, optionally, in combination with system memory 310, computer-readable storage media 322 may comprehensively represent remote, local, fixed, and/or removable storage devices plus storage media for temporarily and/or more permanently containing, storing, transmitting, and retrieving computer-readable information.

Computer-readable storage media 322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 300.

By way of example, computer-readable storage media 322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 322 may include, but is not limited to, Zip® drives, flash memory cards, universal serial bus (USB) flash drives, secure digital (SD) cards, DVD disks, digital video tape, and the like. Computer-readable storage media 322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 300.

Communications subsystem 324 provides an interface to other computer systems and networks. Communications subsystem 324 serves as an interface for receiving data from and transmitting data to other systems from computer system 300. For example, communications subsystem 324 may enable computer system 300 to connect to one or more devices via the Internet. In some embodiments communications subsystem 324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 324 can provide wired network connectivity (e.g., Ethernet) in addition to or instead of a wireless interface.

In some embodiments, communications subsystem 324 may also receive input communication in the form of structured and/or unstructured data feeds 326, event streams 328, event updates 330, and the like on behalf of one or more users who may use computer system 300.

By way of example, communications subsystem 324 may be configured to receive data feeds 326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 324 may also be configured to receive data in the form of continuous data streams, which may include event streams 328 of real-time events and/or event updates 330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 324 may also be configured to output the structured and/or unstructured data feeds 326, event streams 328, event updates 330, and the like to one or more databases that may be in communication with one or more streaming data source computers coupled to computer system 300.

Computer system 300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Figure 4:
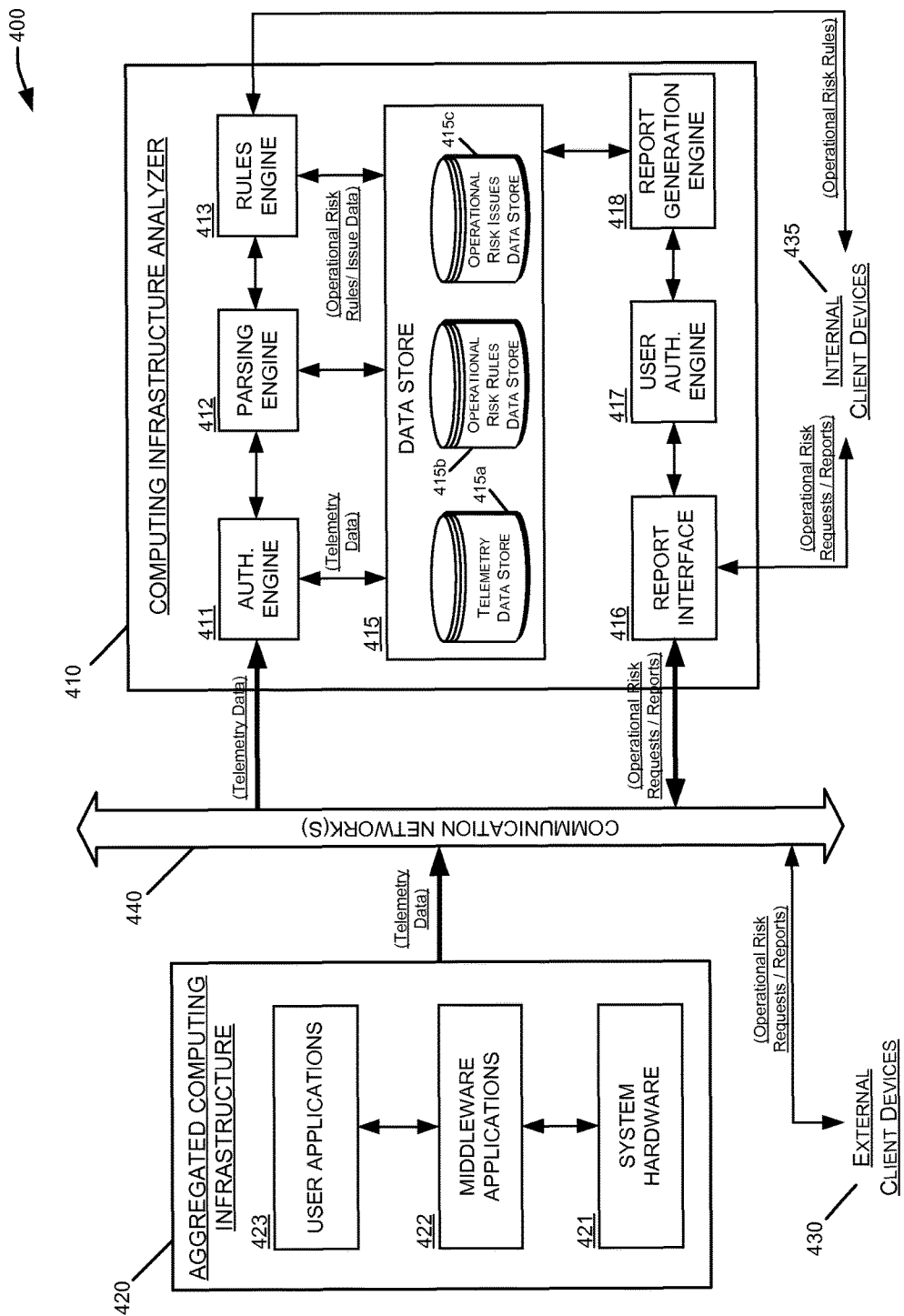
FIG. 4 is a block diagram illustrating, at a high-level, elements of a system including an aggregated computing infrastructure and a computing infrastructure analyzer, in accordance with one or more embodiments of the present invention.

FIG. 4 is a block diagram illustrating a computing environment 400 comprising a computing infrastructure analyzer system, according to one or more embodiments of the present invention. In this example, computing environment 400 includes a computing infrastructure analyzer 410 that receives and processes operational status data (or telemetry data) from an aggregated computing infrastructure 420, via one or more communication networks 440.

Additionally, the computing infrastructure analyzer 410 may interact with various external client devices 430 and/or internal client devices 435 to generate and store operational risk rules, and generate and provide operational risk reports on computing infrastructures to client devices 430 and 435.

Each of the components shown in the example computing environment 400 may correspond to a single computer server or a complex computing system including a combination of computing devices, storage devices, network components, etc. Further, each of these components and their respective subcomponents may be implemented in hardware, software, or a combination thereof. As shown in FIG. 4, the computing environment 400 may include multiple separate computing systems, such as a computing infrastructure analyzer 410, an aggregated computing infrastructure 420, and client devices 430 and 435, operating in communication with one another over communications networks 440. These separate computing systems may correspond to separate implementations of hardware, software, and networking components, which may be operated at separate physical locations and/or by separate entities. However, in some embodiments, the various computing systems 410-435 in the computing environment 400 may correspond to a single integrated computing system with dedicated hardware and/or software that operates at the same physical location and under the control of a single entity. For instance, an aggregated computing infrastructure 420 may include an integrated subcomponent with dedicated hardware and/or software resources to perform the functionality of a computing infrastructure analyzer 410. In such examples, communications networks 440 may be optional, or may be an intranet or LAN rather than the various WAN computer networks or other communication networks that may be used in other embodiments.

Computing environment 400 may be implemented as a client-server or multi-tier computer architecture, which may include web-based implementations and/or cloud-based implementations. For example, various components and computing systems within the computing infrastructure analyzer 410 may be implemented as an analytics server to receive and process operational data from multiple different computing infrastructures 420. The computing infrastructure analyzer 410 may also include a web-based report server configured to receive and respond to requests for operational risk reports from various clients 430 and 435. In some architectures, the computing infrastructure analyzer 410 may be implemented as one or more middle-tier systems providing access to secure data stores 415 which operate in a separate computing environment.

FIG. 4 illustrates, among other techniques, the transmission of operational status data from the aggregated computing infrastructure 420 to the computing infrastructure analyzer 410. Operational status data, also referred to herein as telemetry data, may include any data describing a status of a component operating within a computing infrastructure 420. Examples of operational status data may include system faults, alerts, or messages from any hardware or software operating in the aggregated computing infrastructure 420. Operational status data may indicate hardware issues such as hardware faults, failures, or outages (e.g., CPU offline, memory offline, and other system failures). Operational status data also may indicate operating system or software (e.g., firmware, middleware, and user application software) issues, for example, critical alerts and non-critical messages within operating system logs, event logs, application logs, or service logs. Additional operational status data may include usage data, configuration data, load data, performance metrics, and the like, for any hardware, software, or network component within the aggregated computing infrastructure 420. In further examples, operational status data may include data from network and/or resource monitoring tools implemented separately from the individual hardware/software components 421-423 of the computing infrastructure 420.

The aggregated computing infrastructure 420 in this example includes three separate systems: a hardware system 421, a middleware applications system 422, and a user applications system 423. Each system 421-423 may transmit telemetry data, individually or together, via communication networks 440 to a computing infrastructure analyzer 410. Data bundles, each bundle containing one or more pieces of operational status data, may be transmitted from systems 421-423 or combinations of systems 421-423. The data may be encoded and/or encrypted before transmission. In some embodiments, each system 421, 422, 423 may individually encode, encrypt, package (e.g., zip) and transmit its own operational status data as data bundles. Alternatively or additionally, a single data bundle may include operational status data from multiple different systems within an aggregated computing infrastructure 420. For instance, an aggregated computing infrastructure 420 may include multiple integrated systems with a common telemetry subsystem to allow operational status data from the multiple integrated systems to be bundled and transmitted together. Additionally, it should be understood that computing infrastructure 420 is only a simplified example, and that in various implementations each subsystem 421-423 may include may multiple different computer servers and devices, multiple different software layers, storage devices, network devices, and various other hardware and software components. Another example of an aggregated computing infrastructure is described below in FIG. 5.

Operational status data (also referred to as telemetry data) may be transmitted from various systems of aggregated computing infrastructures 420, over communication networks 440, and received by a computing infrastructure analyzer 410. In some embodiments, the telemetry data may be transmitted over networks 440 using one or more secure communications channels. As shown in this example, telemetry data may be received by an authentication engine 411. The authentication engine 411 and/or parsing engine 412 may decrypt, decode, and/or unpack (e.g., unzipped) the telemetry data bundles, before storing in the telemetry data in a secure telemetry data store 415*a*. In some cases, telemetry data bundles may be zip files. As discussed in more detail below, telemetry data bundles received from different infrastructures 420 and/or different systems 421-423 may be encoded, encrypted, and/or packaged differently. Therefore, the authentication engine 411 and/or parsing engine 412 may determine appropriate techniques for decoding, decrypting, and unpacking (e.g., unzipping) based on the specific infrastructure and/or system from which the telemetry data was originated or transmitted.

In some embodiments, the authentication engine 411 and/or parsing engine 412 may include specialized hardware and/or software components to decode, decrypt, unpack, parse and/or reformat the received telemetry data. For example, authentication engine 411 may include one or more specialized computer servers (e.g., web servers and/or authentication servers), along with network interface controllers (NICs) and specialized networking components such as firewalls, routers, gateways, and/or load balancers. Parsing engine may include parsing processors and one or more parsing grammars used to parse bundles of telemetry data from various computing systems 421-423. As discussed in more detail below, the computing infrastructure analyzer 410 may receive telemetry data from various different hardware devices (e.g., servers, storage, and network devices) and software applications (e.g., operating systems, firmware, device drivers, middleware, and user applications) having different manufacturers, configured at different times and in different situations, and operating under different conditions in different geographic locations. Additionally, these systems 421-423 may combine legacy hardware, software, storage, and communications networks, with newly implemented systems. Therefore, the authentication and parsing techniques performed by the authentication engine 411 and/or parsing engine 412 may include various different techniques for decoding, decrypting, unpacking (e.g., unzipping), parsing and reformatting the telemetry data, based on the characteristics of the hardware and/or software system(s) from which the telemetry data was received.

FIG. 4 also illustrates the generation and storage of operational risk rules and operational risk issue data relating to aggregating computing infrastructures 420. As discussed below, a rules engine 413 may store and manage operational risk rules, and may evaluate the operational risk rules against telemetry data received from the systems 421-423 in a computing infrastructure 420. Operational risk rules may be used to quantify different operational states of one or more systems 421-423 in a computing infrastructure 420. In some embodiments, operational risk rules may include criteria that may be compared to the telemetry data received from computing infrastructure 420 indicating the operational status of the systems 421-423 within the computing infrastructure 420. Each operational risk rule may include a single criteria or multiple criteria, and as many as 10's, 100's, or 1,000's of criteria may be combined into a single rule.

Criteria in operational risk rules may correspond to specific data items (or data points) of operational status data for hardware and/or software systems a computing infrastructure 420. For instance, operational risk rule criteria relating to hardware systems (e.g., servers, storage devices, network devices, etc.) may correspond to the type, model, manufacturer, date of manufacture, and/or features of the hardware. Similarly, operational risk rule criteria relating to software systems (e.g., firmware, operating systems, middleware, device drivers, user applications, etc.) may include the software application, operating system, version, release date, patches, and the like, for any software in the computing infrastructure 420. Additional criteria in operational risk rules may correspond to various system faults, alerts, or messages from any hardware or software operating in the aggregated computing infrastructure 420, as well as system usage data, load data, performance metrics, and the like. Moreover, certain criteria may originate from external systems other than the hardware and software systems within the computing infrastructure 420. For instance, notifications from third-party vendors indicating hardware recalls, software defects or patches, or notifications from external network monitoring devices indicating network congestion or outages, may correspond to operational risk rule criteria.

Rules engine 413 may compare the operational status data for a specific computing infrastructure 420 to the criteria of one or more operational risk rules. For example, the rules engine 413 may include specialized processors and other hardware and software components to identify and retrieve rules from an operational risk rule data store 415*b*, and then to retrieve the corresponding operational status data for the computing infrastructure 420 from the telemetry database 415*a*. When the rules engine 413 determines that the criteria of an operational risk rule are satisfied for a specific computing infrastructure 420, the rules engine 413 may generate and store an operational risk issue and/or may calculate an operational risk value based on the satisfaction of the rule for the computing infrastructure 420. In some embodiments, each operational risk rule may have an associated probability value and an associated severity value, and the rules engine 413 may use the probability and severity values to compute a risk value for the computing infrastructure 420 when the operational status of the infrastructure satisfies the rule. After determining that one or more systems 421-423 and/or computing infrastructures 420 satisfy a rule criteria, the rules engine 413 may create and store an operational risk issue, for example, in data store 415*c*.

FIG. 4 further illustrates that the computing infrastructure analyzer 410 may receive requests for operational risk reports from client devices 430-435, and may generate and transmit operational risk reports responsive to the requests. For example, a report interface 416 may receive requests from external client devices 430 and internal client devices 435 to generate an operational risk report on one or more systems 421-423 and/or computing infrastructures 420. Client devices 430 and 435 may include any of the client computing devices discussed above (e.g., 102-108), such as servers, desktop and laptop computers, mobile devices, etc. Client devices 430 and 435 may include various client-side I/O components and network components, as well as computing components to execute client software applications. For instance, a client device 430 or 435 may directly access a user interface (e.g., a web-based interface or standalone client application interface) generated by the report interface 416 to allow the client device to generate and receive operational risk reports. In other examples, software applications executing on client devices 430 and 435 may invoke an API, web service, or application service within the report interface 416 to programmatically request, generate, and/or receive operational risk reports.

A user authentication engine 417 may be integrated with the report interface 416 or implemented as a separate hardware and/or software component system. As discussed below, different client devices 430-435 and/or users may have different authorization levels with respect to generating and viewing operational risk reports. For instance, certain users may be authorized to receive only high-level risk summaries, while other users may be authorized to receive more detailed operational risk analyses and suggested remedies. Additionally, user permissions may be restricted based on individual systems 421-423 and/or computing infrastructures 420, so that a user may be authorized to receive operational risk analyses of one system 421 but not another, or one computing infrastructure 420 but not another, etc. Accordingly, the report interface 416 and/or the user authorization engine 417 may be configured to obtain or confirm the proper authorization for the requested reports received from various client devices 430-435. These components may use various techniques (e.g., user name/password verification, biometric security, IP address filtering, etc.) to prohibit access to unauthorized users and systems. In order to implement secure access to the operational risk data stores 415 and report generation engine 418, the report interface 416 and/or the user authorization engine 417 may include various specialized hardware and/or software components to validate requests, encrypt operational risk data and reports, and transmit data and reports over secure transmission channels. For example, the report interface 416 and/or the user authorization engine 417 may include one or more specialized computer servers (e.g., web servers and/or authentication servers), along with network interface controllers (NICs) and specialized networking components such as firewalls, routers, gateways, and/or load balancers.

In some embodiments, multiple different report interfaces 416 and/or user authorization engines 417 may be implemented to receive and respond to requests from external client devices 430 and internal client devices 435. External client devices 430 may operate on remote (and potentially untrusted) systems and networks, over one or more non-secure networks 440. Therefore, the report interface 416 and/or user authorization engine 417 may require various encoding and/or encryption of data, along with various secure transmission techniques and protocols. For instance, web services may use the Secure Sockets Layer (SSL) or Transport Layer Security (TLS) protocol to provide secure connections between the external client devices 430 and the computing infrastructure analyzer 410. SSL or TLS may use HTTP or HTTPS to provide authentication and confidentiality. Web services also may be implemented using the WS-Security standard, which transmits secure SOAP messages using XML encryption. In contrast, internal client devices 435 may operate on the same secure network as the computing infrastructure analyzer 410, and thus may bypass some or all of the encoding, encryption, and/or secure transmission infrastructure required for external clients 430.

After receiving an authenticated request for an operational risk report for an aggregated computing infrastructure 420, the authenticated request may be passed to a report generation engine 418 for processing. The report generation engine 418 may include, for example, database client tools and processors to retrieve operational risk data from various data stores 415 and generate an operational risk report based on the data. For example, the report generation engine 418 may generate a report for an aggregated computing infrastructure 420 by retrieving the operational risk issues for individual systems 421-423 and/or the computing infrastructure 420 as a whole from the operational risk issue data store 415*c*. In some cases, the corresponding telemetry data may be retrieved from the telemetry data store 415*a* and included/attached to a report. Additionally, corresponding rule data may be retrieved from the rules data store 415*b* and included in the report, such as the rule criteria and any known/suggested remedies associated with an operational risk rule. The report generation engine 418 may generate operational risk reports including the retrieved data, and provide the reports to the report interface 417 for transmission to client devices 430 and 435.

Figure 5:
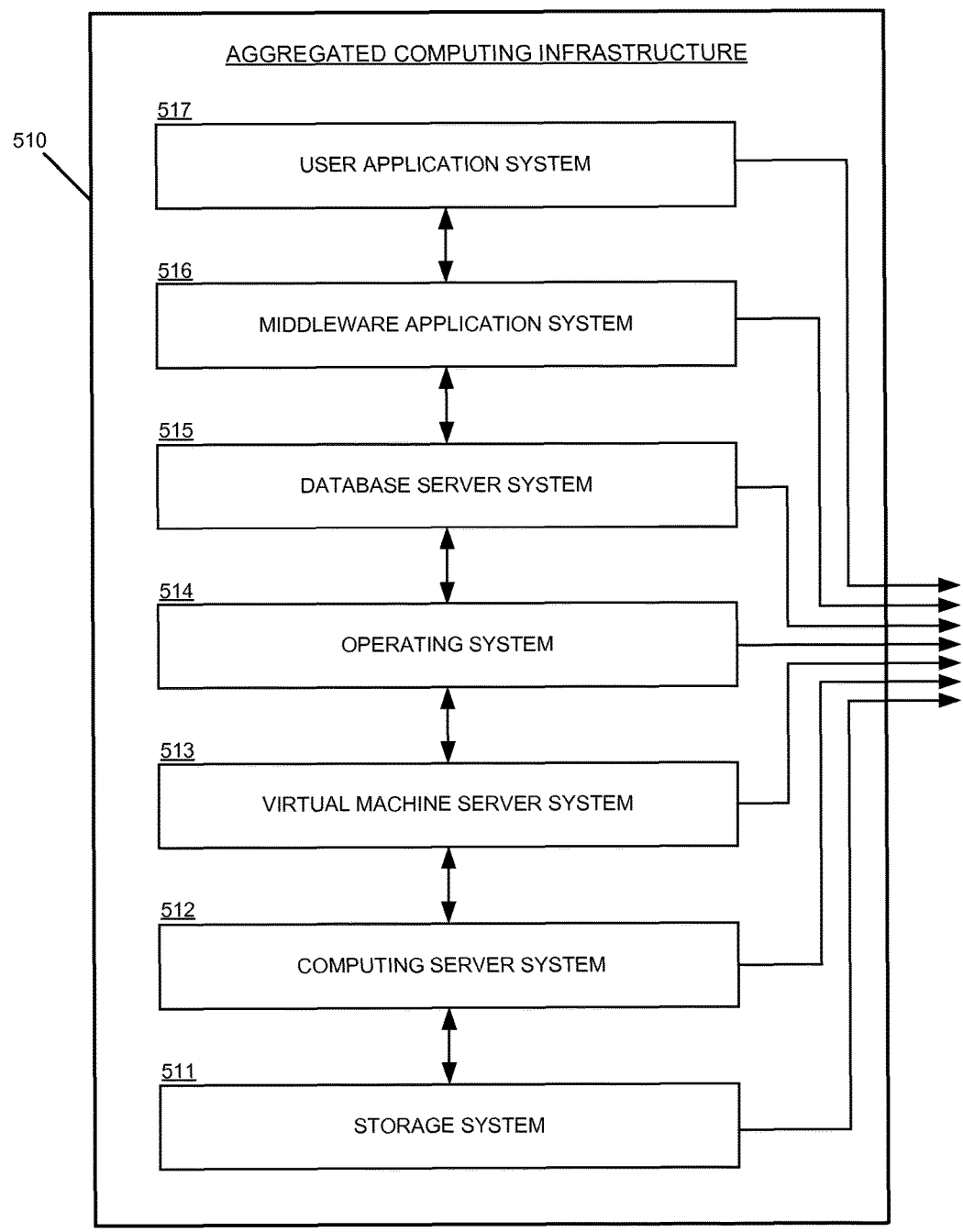
FIG. 5 is a block diagram illustrating an example of an aggregated computing infrastructure comprising multiple hardware and/or software systems, in accordance with one or more embodiments of the present invention.

FIG. 5 is a block diagram illustrating an example of an aggregated computing infrastructure 510. As shown in this example, and discussed above in the example computing infrastructure 420, an aggregated computing infrastructure is a configuration of multiple interactive hardware and/or software systems. The combination of multiple hardware and/or software systems in an aggregated computing infrastructure may be used to implement an end-to-end comprehensive computing system. Each component within an aggregated computing infrastructure (also referred to as a system) may include one or more hardware devices (e.g., servers, storage, and network devices) and/or one or more software applications (e.g., operating systems, firmware, device drivers, middleware, and user applications). Although the example aggregated computing infrastructure 510 includes seven systems 511-517 configured as a stack infrastructure, other examples may include different combinations of systems and/or may be arranged in different configurations. Additionally, the aggregated computing infrastructure 510 may be an integrated In some embodiments, the aggregated computing infrastructure 510 may be an integrated infrastructure 510, in which the individual systems 511-517 have been designed, configured, and tested as an integrated computing solution 500 prior to deployment. For example, aggregated computing infrastructure 510 may be designed and implemented as a combination of selected computer servers and storage devices, along with virtual machine servers, operating systems, database, middleware, and user application software. Such infrastructure 510 may be specially implemented in accordance specific computing system requirements, and may be offered as a single integrated computing solution. In other embodiments, the aggregated computing infrastructure 510 need not be designed and implemented as an integrated stack, but may include various interactive hardware and/or software systems having different manufacturers and compatibilities. For instance, some aggregated computing infrastructures 510 may combine legacy hardware, software, storage, and network components, with newly implemented systems. Such infrastructures 510 may be deployed and configured individually at different times, and may operate in different data centers and/or different geographic locations.

In this example, the aggregated computing infrastructure 510 may be configured as an integrated stack including hardware and software systems 511-517. Storage system 511 may include, for example, one or more disk arrays (e.g., network-attached storage arrays, storage area networks, etc.), and/or other storage systems. Computing server system 512 may include, for example, one or more reduced instruction set computing (RISC) processor-based and/or x86 processor-based server systems. In some examples, multiple computer servers 512 may include common processors, as well as other hardware components for memory interconnect, I/O, and the like. Virtual machine server system 513 may include one or more server software applications to support virtualization capabilities on servers 512, along with the creation and management of large numbers of virtual machines. Different virtual machine server systems 513 may offer different virtualization options, such as flexible and secure live migration between hosts, dynamic resource management of CPU, memory, virtual I/O, and crypto accelerators on running virtual machines, redundant virtual networks and disks, etc. Operating systems 514 may include operating systems of various types and features configured to support servers, workstations, and/or mobile devices. For example, operating systems 514 may include, without limitation, server operating systems such as BSD®, LINUX®, MAC OS X®, ORACLE SOLARIS®, MICROSOFT WINDOWS®, and/or IBM Z/OS®. The features of operating systems 514 in various embodiments may include integrated cloud support, virtualization, and software-defined networking capabilities, as well as optimization for database, middleware, and application deployments. Database server system 515 may include one or more database management software systems configured to store and analyze data through various interactions with users, software applications, and underlying stores. For example, database servers 515 may include, without limitation, MICROSOFT SQL SERVER®, ORACLE DATABASE®, SYBASE ADAPTIVE SERVER ENTERPRISE®, POSTGRE SQL®, MySQL®, and IBM DB2®. Middleware application system 516 may include one or more middleware computer servers and software tools configured to support deployment and delivery of user applications. Middleware applications system 516 may include, for example, web servers, content management servers, and/or application servers. User application system 517 may include various application servers and software applications to support interaction with end user devices as well as other applications and systems. User application system 517 may include, without limitation, supply chain management (SCM) software systems, human resource management software systems, customer relationship management (CRM) software systems, financial management software systems, and enterprise performance management (EPM) software systems, as well as various other software systems designed for users within companies, educational or governmental entities, and other organizations.

As shown in this example, each individual system 511-517 within an aggregated computing infrastructure 510 may be configured to monitor, capture, and transmit its own operational status data to one or more computing infrastructure analyzers 410. For example, storage system 511 may create and transmit a data bundle including operational status data indicating the usage, status, and health of each hard disk drive (HDD) in its various storage arrays, while the user application system 517 may transmit create and transmit a data bundle including operational status data indicating software exception, usage data, current status and health, data from event logs and application logs, and the like. In such cases, the individual systems 511-517 each may include the hardware and software components to perform self-monitoring and reporting of its telemetry data to the computing infrastructure analyzer 410. Different systems 511-517 may use the same protocols and techniques for bundling, encoding, encrypting, and/or transmitting telemetry data in some cases, while in other cases using different protocols and techniques that may require the computing infrastructure analyzer 410 to employ different corresponding protocols and techniques for receiving and parsing the data depending on the originating system 511-517. In other embodiments, a single component within the aggregated computing infrastructure 510 may be configured to receive telemetry data from each system 511-517, combine and bundle the data using common protocols and techniques, and transmit the combined data bundle to the computing infrastructure analyzer 410.

Figure 6:
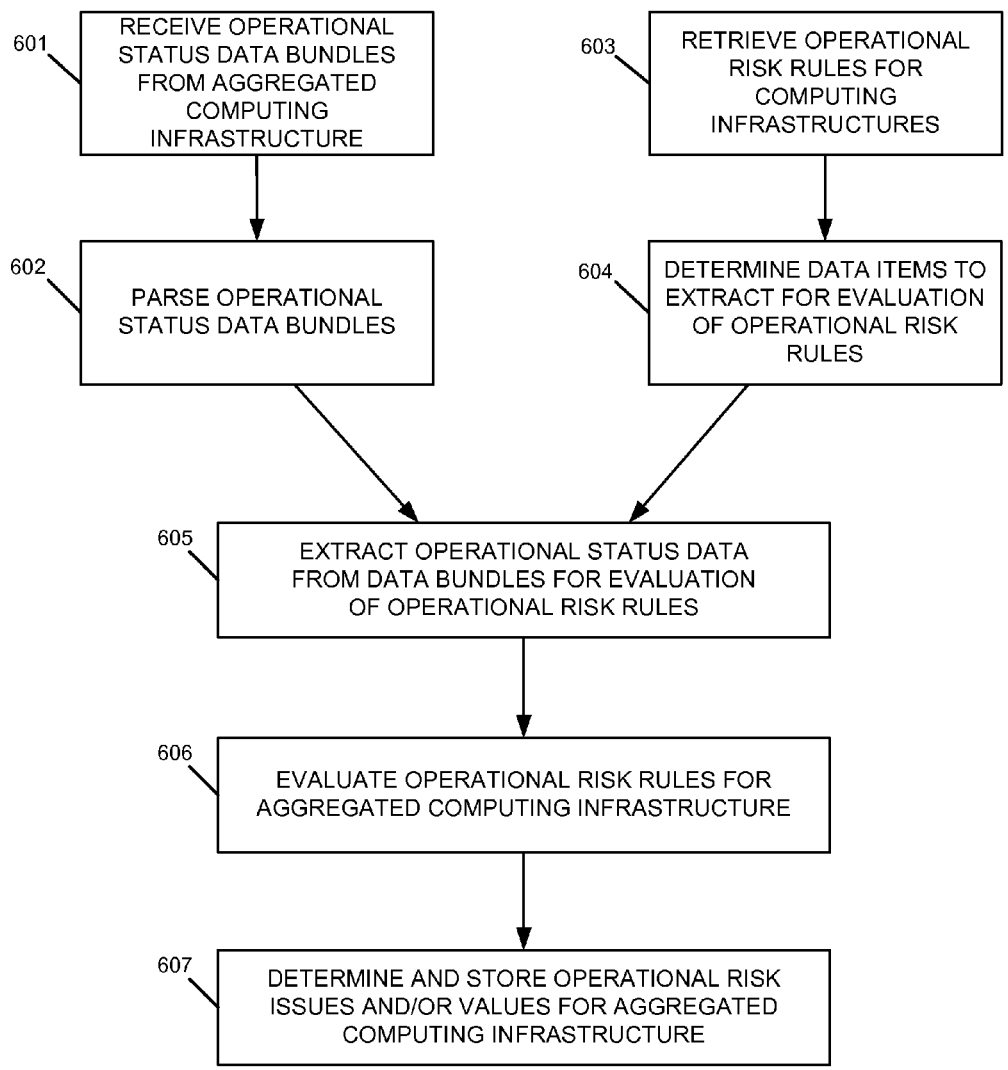
FIG. 6 is a flowchart illustrating a process for determining and extracting operational status data for an aggregated computing infrastructure, and evaluating operational risk rules based on the extracted operational status data, according to one or more embodiments of the present invention.

FIG. 6 is a flowchart showing an example process of evaluating operational risk rules and determining operational risk issues and values, based on operational status data extracted from data bundles of operational status data for an aggregated computing infrastructure. As described below, the different steps in this process may be performed by one or more components in the example system 400, such as an authentication engine 411, parsing engine 412, rules engine 413, and/or other systems within a computing infrastructure analyzer 410. Alternatively or additionally, one or more of the process steps may be executed by components within the aggregated computing infrastructure 420, client devices 430-435, and/or other external systems (e.g., external or cloud-based remote storage and processing systems). Further, it should be understood that the parsing, storing, and evaluation of operational risk rules and operational status data as described herein need not be limited to the specific system and hardware implementations described above in FIGS. 1-5, but may be performed within other computing environments comprising other combinations of the hardware, software, and network components.

Initially, FIG. 6 shows a first process branch corresponding to receiving and parsing operational data bundles (steps 601 and 602) and a second process branch corresponding to retrieving operational risk rules and determining data items for extraction based on the operational risk rules (steps 603 and 604). As illustrated in FIG. 6, these branches may be performed separately and independently, for example, they may be initiated by separate actions and/or may be executed by separate processes. In some embodiments, data received or determinations performed in one process branch may initiate the execution of the other process branch. For instance, the receipt of a new or updated telemetry data bundle in step 601 may prompt a process within the system 400 to execute steps 603 and 604. Similarly, the receipt and processing of new or updated operational risk rules in steps 603 and 604 may prompt a process within the system 400 to retrieve previous sets of operational data, or to request new operational data bundles, and then to execute steps 601 and 602. Moreover, although steps 601-604 are illustrated as different branches in this example, they may be performed sequentially in other examples, and may be executed in various different orders. Additionally, although the example of FIG. 6 relates to evaluating an existing set of operational risk rules 415b based on the newly-received operational status data from an aggregated computing infrastructure 420, similar processes and techniques may be executed for newly-created operational risk rules based on previously stored operational status data, and/or updates are received to previously stored operational risk rules or operational status data.

In step 601, one or more data bundles containing operational status data are received by a computing infrastructure analyzer. As described above, an authentication engine 411 and/or parsing engine 412 may receive data bundles containing operational status data (or telemetry data) of an aggregated computing infrastructure 420. A data bundle may include one or more pieces of data relating to the operational status of the aggregated computing infrastructure 420. The telemetry data within data bundles may include the specifications and configurations of any hardware or software within the aggregated computing infrastructure 420. For example, the telemetry data may contain data describing a specific hardware device (e.g., storage array, computer server, network device, etc.) within a computing infrastructure 420, including the device type, manufacturer, model name/number, serial number, manufacturing date, sale date, device history, device name, current and previous device owners or users, previous issues or repairs on the device, and the like. The telemetry data also may contain the current states of any user-configurable settings of the device. Additional telemetry data in data bundles may describe a specific software application loaded and/or executing within the computing infrastructure 420, including any server applications, database applications, virtual machine servers, middleware applications, and/or user applications. For each application, the telemetry data include the application name, version, specifications (e.g., operating system, language, etc.) related software (e.g., service packs, patches, etc.), installation date, and the device(s) and system(s) on which the software has been deployed within the computing infrastructure 420. The telemetry data also may contain the current states of any user-configurable settings of the application. Other types of telemetry data may include the network configuration of the computing infrastructure 420, for example, the network device specifications and arrangements, network protocols and ports used, physical network characteristics, and the like. Additionally, the telemetry data received in step 601 may include usage data relating to any system of the computing infrastructure 420. For instance, example systems 511-517 may generate various usage data in the form of system outputs, log files, operational histories, and system performance data. Such data may include, without limitation, any successful or failed transaction or operation, system errors, exceptions, component failures, crashes, memory leaks, and any data logged (or loggable) to an event log, application log, service log, etc. Additional examples of telemetry system usage data may include, without limitation, memory usage, storage usage, processor usage, network usage, and I/O usage associated with an individual system 511-517, a combination of systems, and/or an entire computing infrastructure. Additional examples of telemetry data may include any environment data and other factors associated with the aggregated computing infrastructure 420, such as the geographic locations of data centers, network providers and power source/power grid providers, data center specifications such as data room/server room size, location, room temperature, and configuration (e.g., relative positioning of hardware components), and the like. Additional environment data may include data relating to any peripheral or support devices used to implement the aggregated computing infrastructure 420 (e.g., power cords, network cables, peripheral I/O devices, fans or air conditioners, etc.), data relating to other systems not within the same computing infrastructure 420 but that share computing or physical resources (e.g., within the same data center), and data relating to the human operators and/or the organizational policies controlling the management and maintenance of the various systems within the aggregated computing infrastructure 420.

Data bundles received in step 601 may contain any of the data described above, and any other operational status data discussed herein, for a single system or multiple systems within an aggregated computing infrastructure 420. Telemetry data bundles may be received directly from one or more systems of aggregated computing infrastructure 510, or may be received from a third-party intermediary, data store (e.g., telemetry data store 415a), or other sources for telemetry data relating to one or more computing infrastructures 420. The telemetry data bundles received in step 601 may include files or batches of telemetry data, or may be received using event stream processing or other event-driven technologies.

In step 602, which may be combined with step 601, one or more components within a computing infrastructure analyzer 410 (e.g., authentication engine 411 and/or parsing engine 412) may decode, decrypt, unpack, parse and/or reformat the received telemetry data. As discussed above, telemetry data bundles may be transmitted over networks 440 using one or more secure communications channels before being received at the computing infrastructure analyzer 410. Accordingly, the telemetry data bundles received in step 601 may be encrypted, encoded, and/or packaged (e.g., zipped) using various different techniques and protocols. In some cases, different systems 511-517 or different infrastructures 510 may use different encryption, encoding, and packaging techniques, and thus the computing infrastructure analyzer 410 may determine the appropriate techniques before decrypt, decode, and/or unpack (e.g., unzipped) telemetry data bundles. In some cases, steps 601 and 602 may represent receiving and parsing newly-collected bundles of operational status data from a computing infrastructure 420, while in other cases steps 601 and 602 may represent retrieving and parsing operational status data that was previously received, authenticated, and stored in a data store (e.g., telemetry data store 415a).

In step 603, one or more operational risk rules may be retrieved by a rules engine 413 or other components within a computing infrastructure analyzer 410. As described above, operational risk rules may include various criteria with parameters that may compared to the operational status data of a computing infrastructure 420. An operational risk rule may have a single criteria or multiple criteria, each of which may correspond to a piece of operational status data. A rule criteria may correspond to any of the examples of operational status data discussed above in reference to step 401, as well as any other examples of operational status data described herein. For example, a rule criteria may be a specification of a particular hardware device model, feature, or capability, or a specification of a particular software application, version, operating system, etc. Rule criteria also may correspond to any configuration or user-setting of a hardware or software system, any log data, system faults or alerts, or any other output from a hardware or software system. Other rule criteria may correspond to environment data and other factors associated with the aggregated computing infrastructure 420 (e.g., geographic factors, data center setup, usage conditions, etc.). Still further examples of rule criteria may include external conditions not corresponding to any operational status data received from computing infrastructure 420, for instance, notifications from third-party vendors, data from external system or network monitors, etc.

Referring briefly to FIG. 7A, an illustrative table 700a is shown including five example operational risk rules that may applicable to certain aggregated computing infrastructures. Each rule in this example includes a list of criteria, corresponding probability (0 to 1) and severity (0.0 to 10.0) values, and a description of the operational risk and remedial information associated with the rule. As discussed above, if a rule's criteria are satisfied by the current operational status of a computing infrastructure 420, then the probability and severity values may be used to prioritize the system risk associated with the rule. The description and remedial information associated may further describe the rule conditions, the origination of the rule, and what actions may be performed within the computing infrastructure to address the system risk. Such remedial actions may include, for instance, repair or replacement of hardware, upgrading or patching of software, changes in user-configurable settings, etc. The rules in table 700a, while non-limiting and illustrative only, provide examples of various combinations of criteria that may be implemented in some embodiments. For example, the criteria of RuleID_0001 indicates that a system risk may be present (e.g., a software bug or vulnerability) in an aggregated computing infrastructure 510 running a certain operating system along with a certain user application/service pack having a certain previous software patch. The criteria of RuleID_0002 indicates that another system risk may be present (e.g., a hardware failure or system crash) in an aggregated computing infrastructure 510 using a certain model of server system, configured with a certain device setting, when the error log for the server includes a certain specified error message. The criteria of RuleID_0003 indicates that another system risk may be present (e.g., a software failure or performance degradation) in an aggregated computing infrastructure 510 running a certain operating type, a certain middleware application, a certain user application, when the computing infrastructure supports at least a specified number of virtual machines. The criteria of RuleID_0004 indicates that another system risk may be present (e.g., data center fire or heat-related hardware damage) in an aggregated computing infrastructure 510 running a certain storage array device, having at least a specified number of hard disk drives, when a specified type of power cord is used with the storage array. Finally, the criteria of RuleID_0005 indicates that another system risk may be present (e.g., network congestion, security vulnerability, etc.) in an aggregated computing infrastructure 510 running a certain storage device, using a specified network type, and executing a specific user application. It should be understood that these example illustrate only a fraction of the different possible criteria combinations that may be implemented for operational risk rules.

In step 604, the operational risk rules may be parsed and/or analyzed to determine the specific pieces of data that should be extracted from the operational status data bundles received from aggregated computing infrastructures in step 601. In some cases, each separate criteria within an operational risk rule may represent a piece of data to be extracted. For instance, referring to RuleID_0001, the rules engine 413 (or other components within the computing infrastructure analyzer 410) may parse the criteria to determine that, in order for RuleID_0001 to be evaluated, certain specific telemetry data must be retrieved that specifies the operating system(s) executing in the computing infrastructure 510, whether or not the specified user application is running within the computing infrastructure 510, and if so, whether or not the user application includes the specified service pack(s) and software patch(es).

After determining which data items are needed to evaluate the operational risk rules, the rules engine 413 may create/store reference data or instructions that indicate where the needed data may be found within the telemetry data bundles. For example, for each data item determined in step 604, the rules engine 413 also may determine and store data identifying: the system(s) (e.g., 511-517) within a computing infrastructure 510 that may capture the data item, a data bundle and/or telemetry file that may contain the data item, the location of the data item within a data bundle or telemetry file, and/or field names, data patterns, and the like that may be used to locate and extract the data item.

In step 605, the specific data items identified in step 604 may be extracted from the operational status data bundles received in step 601. For example, as discussed above, a specific data item corresponding to a criteria for an operational risk rule may be identified based on its source system 511-517, the name, type, or other identifier of a telemetry data bundle or file, the location of the data item within a telemetry data bundle or file, and other data such as a field names, data patterns, etc., that may be used to locate and extract the data item from the data bundles received in step 601.

In step 606, the operational risk rules retrieved in step 603 may be evaluated for one or more aggregated computing infrastructures 510, using the operational status data extracted from the telemetry data bundles in step 605. Operational risk rules may be evaluated by comparing the parameters for each rule criteria to the corresponding operational data extracted from the telemetry data bundles. For example, referring again the RuleID_0002 in example rule table 700a, one or more of the following comparisons may be performed: a hardware model identifier (e.g., model name or number) of the server systems 512 running in the computing infrastructure 510 may be compared to the model identifier specified in the rule ("aaa"); the user-configurable settings for each "aaa" server system 512 may be compared to the device setting specified in the rule ("bbb"), and the event logs generated by each "aaa" server system 512 configured with the "bbb" setting may be examined to identify the error log entry specified in the rule ("ccc"). In this example, the criteria for RuleID_0002 may be satisfied for an aggregated computing infrastructure 510, if that computing infrastructure includes a "aaa" server system 512 with user-configurable setting "bbb" and an error log entry matching "ccc". Similar processes may be used to evaluate rule criteria in other examples, even though other rules may use different numbers of criteria, different data items, different parameters, and the like.

Moreover, as discussed above, certain criteria for operational risk rules might not be based on telemetry data from the aggregated computing infrastructure 510, but may correspond to other external data sources. For example, certain data relevant to the operational risk of an aggregated computing infrastructure 510 might not be found within the telemetry data bundles of that computing infrastructure 510. Such data may include environmental data, peripheral data, system or network usage data, data relating to the operating conditions of the aggregated computing infrastructure 510, and other such data discussed above in step 601. For instance, data such as the geographic location of a hardware system, the specifications of power cords, fans, I/O and other peripheral devices, the hardware arrangements and room temperatures within data centers, organizational policies governing the operation of the computing infrastructure, and the like, might not be included in telemetry data bundles but instead may be collected and transmitted to the computing infrastructure analyzer 410 by other external data sources. Such data also may be input by users via client devices 430-435. For instance, in response to determining certain data items in step 604 that are not contained within the telemetry data bundles, the computing infrastructure analyzer 410 may initiate a user interface to request the data items from an external client 430 associated with the computing infrastructure 510.

In step 607, one or more systems within the computing infrastructure analyzer 410 may determine the existence of operational risk issues based on the evaluation in step 606 and/or may calculate various operational risk values for an aggregated computing infrastructure based on the operational risk issues. For example, during the evaluation of the operational risk rules in step 606, the rules engine 413 may compare the parameters for each criteria of a rule to the corresponding operational data extracted from the telemetry data bundles. Whenever the rules engine 413 determines that the operational status of the aggregated computing infrastructure 420 satisfies the rule, the rules engine 413 may record this determination as an operational risk issue in data store 415c. The operational risk issues stored in data store 415c may include data indicating that a specific aggregated computing infrastructure 420 has satisfied the criteria of a specific operational risk rule, as well as additional data such as the time and date of the telemetry data and/or the evaluation, and the specific hardware and/or software systems (e.g., 511-517) that satisfied the risk rule criteria. As noted above, some operational risk rules have criteria that may be triggered by the telemetry data from a single hardware or software systems 511-517, while other rules may have criteria that relate to multiple different systems. Additionally, the remedial information associated with an operational risk rule may describe a set of actions (e.g., repairs, replacements, reconfigurations, etc.) to be taken on one or more systems within the aggregated computing infrastructure 510. The remedial actions of a rule may be performed on the same systems 511-517 that triggered the rule criteria, or different systems within the computing infrastructure 510. Therefore, the operational risk issues stored in data store 415c may include data identifying specific hardware and/or software systems that satisfied the risk rule criteria, as well as the specific hardware and/or software systems to be affected by the remedial action.

In some embodiments, the operational risk issues determined and/or stored in step 607 may include one or more operational risk calculations. As noted above, an operational risk rule may have an associated probability value indicating the likelihood of a specific operational issue occurring, given that the criteria for the rule have been satisfied. An operational risk rule also may have an associated severity value indicating the seriousness of the rule's potential operational issue. In some cases, determining and/or storing operational risk issues in step 607 may include calculating a risk issue score, for instance, by multiplying the probability and severity values for a risk rule whose criteria have been satisfied. Risk issue scores may be aggregated or summed to determine operational risk index scores for individual systems, combinations of systems, and/or computing infrastructures 510.

Notifications associated with operational risk issue also may be determined and/or stored in step 607, for example, in the operational risk issue data store 415c. Such notifications may define a set of client devices 430-435 and/or users to be notified whenever a risk issue is created within the data store (e.g., upon determining that the criteria of a risk rule has been satisfied). In some embodiments, users may register via client devices 430-435 to receive notifications by email, text, phone, or from within a client software application. User notifications may be tied to individual operational risk rules, or may be tied to operational risk index scores for systems and/or computing infrastructures (e.g., comparisons of current operational risk indices to system or infrastructure thresholds, etc.).

Referring briefly to FIG. 7B, an example is shown of an operational risk issue table 700b for an aggregated computing infrastructure. In this example, the operational risk issue table 700b includes a listing of operational risk issues identified by a system identifier, a risk rule identifier, a risk issue description, and a risk issue score. Although not shown in example table 700b, any other types of data described herein for identifying operational risk issues (e.g., infrastructure identifiers, multiple system identifiers, etc.) and/or other information relating to an operational risk issue (e.g., remedial information, notification information, etc.) may be stored in the operational risk issue data store 415c in other examples.

Figure 8:
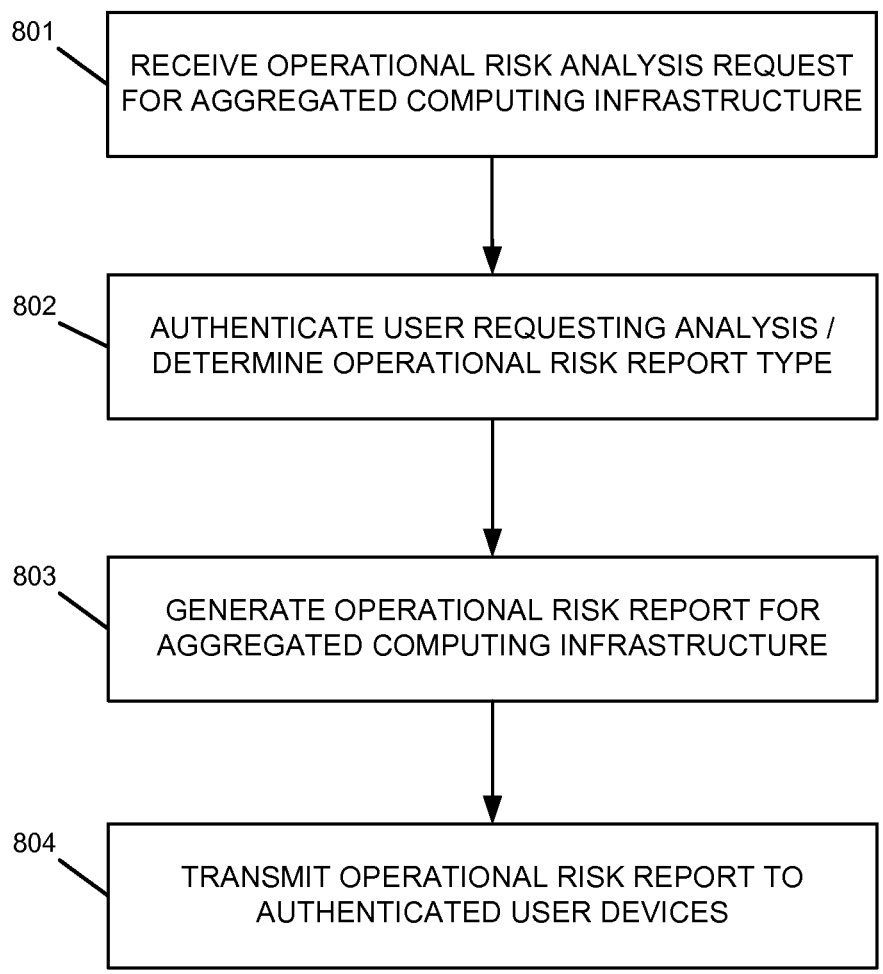
FIG. 8 is a flowchart illustrating a process for generating and transmitting an operational risk report for an aggregated computing infrastructure, according to one or more embodiments of the present invention.

FIG. 8 is a flowchart showing an example process of generating and transmitting operational risk reports for various hardware and/or software systems within an aggregated computing infrastructure. As described below, the different steps in this process may be performed by one or more components in the example system 400, such as a report interface 416, user authentication engine 417, report generation engine 418, and/or other systems within a computing infrastructure analyzer 410. Alternatively or additionally, one or more of the process steps may be executed by components within the aggregated computing infrastructure 420, client devices 430-435, and/or other external systems (e.g., external or cloud-based remote storage and processing systems). Further, it should be understood that receiving and authenticating requests for operational risk analyses and reports, and generating and transmitting operational risk reports as described herein need not be limited to the specific system and hardware implementations described above in FIGS. 1-5, but may be performed within other computing environments comprising other combinations of the hardware, software, and network components.

In step 801, a request is received for operational risk analyses and/or reports relating to hardware and/or software systems 511-517 within an aggregated computing infrastructure 510. As described above, an external client 430 or internal client 435 may transmit a request to a report interface 416 of a computing infrastructure analyzer 410. In some embodiments, a client device 430 or 435 may access a web-based user interface or other client application user interface provided by the report interface 416 to allow the client device to generate and receive operational risk reports. In other examples, software applications executing on client devices 430 and 435 may invoke an API, web service, or application service within the report interface 416 to programmatically request, generate, and/or receive operational risk reports. The requests in step 801 may convey the type of operational risk analyses and/or reports that the client device 430-435 is requesting, including for example, infrastructure and/or system identifiers, operational risk report types, operational risk issue types, operational risk score thresholds, and the like.

In step 802, the request received in step 801 may be authenticated based on the client device 430-435 and/or the individual user authentication credentials associated with the request. In some embodiments, the user authentication engine 417 may perform the authentication of the user credentials and/or client devices in step 802. Different client devices 430-435 and/or different users may have different authorization levels with respect to generating and viewing operational risk analyses and reports. For example, a user may be authorized to request operational risk analyses and reports only for certain specified computing infrastructures and/or certain specified hardware systems and software systems 511-517 within an aggregated computing infrastructure 510. Additionally, a user may be authorized to request only certain types of operational risk data. For example, certain users (e.g., external users associated with a computing infrastructure 420) may have authorization to request only certain operational risk summary scores and index data, while other users (e.g., internal analysts associated with the computing infrastructure analyzer 410) may have authorization to request additional risk issue description data, remedial data, prioritized risk summaries, and the like.

In step 803, an operational risk report may be generated in response to the request received in step 801 and the user authorization determined in step 802. For example, a report generation engine 418 may generate one or more operational risk reports responsive to the request, by retrieving and formatting data from various data stores 415. The reports and/or analyses generated in step 803 may include, for example, a combination of operational risk issue data from data store 415c, operational risk rule data from data store 415b, and/or telemetry data from data store 415a.

Referring briefly to FIGS. 9A and 9B two examples are shown of illustrative operational risk reports relating to an aggregated computing infrastructure. In FIG. 9A, an operational risk dashboard summary interface 900a is shown including operational risk data relating to a set of assets (e.g., host computers) within an aggregated computing infrastructure 510. In FIG. 9B, an operational risk analysis report 900b is shown including the current operational risk index (ORI) value for each system in an example aggregated computing infrastructure 510, as well as a breakdown of all operational risk issues from each system into critical issues, high priority issues, medium priority issues, and low priority issues. In this example, the calculated ORI value and each priority category in each system may be broken down and reviewed in detail by selecting the priority category for a system. In some embodiments, report interfaces 900*a* and 900*b* may be interactive to allow users to review each individual operational risk issue reflected in the report, including reviewing the operational risk rule, the telemetry data files, the rule description and remedial information/ recommendations, and the like.

In step 804, the operational risk report(s) generated in step 803 may be transmitted back to the requesting client devices 430-435. In some embodiments, operational risk reports may be transmitted over a secure transmission channel or secure user interface via the report interface 416. For example, user interfaces and other report data may be encoded and/or encrypted in accordance with the user credentials received in step 801.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of computer-executable instructions, which may be used to cause a computing device, such as a general-purpose or special-purpose processor or logic circuits programmed with the instructions to perform the methods. These computer-executable instructions may be stored on one or more computer-readable mediums or memory devices, such as CD-ROMs or other type of optical disks, floppy diskettes, ROMs, RAMs, EPROMs, EEPROMs, magnetic or optical cards, flash memory, or other types of computer-readable mediums or memory devices suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method comprising:
   receiving, at a computing infrastructure analyzer device, a first data bundle from a first computing system operating in an aggregated computing infrastructure, the first data bundle including data representing the operational status of the first computing system within the aggregated computing infrastructure;
   receiving, at the computing infrastructure analyzer device, a second data bundle from a second computing system operating in the aggregated computing infrastructure, the second data bundle including data representing the operational status of the second computing system within the aggregated computing infrastructure, wherein the second computing system operates separately and independently from the first computing system;
   retrieving, by the computing infrastructure analyzer device, one or more operational risk rules associated with aggregated computing infrastructures, from a data store, each said operational risk rule including a plurality of criteria stored in the data store;
   evaluating, by the computing infrastructure analyzer device, a first operational risk rule, by:
   determining a set of criteria of the first operational risk rule, the criteria including a plurality of computing system criteria, each of the computing system criteria identifying a specific hardware device model or a specific software application version;
   extracting first system data from the first data bundle, the first system data identifying at least one of a first specific hardware device model or a first specific software application version of the first computer system in the aggregated computing infrastructure;
   extracting second system data from the second data bundle, the second system data identifying at least one of a second specific hardware device model or a second specific software application version of the second computer system in the aggregated computing infrastructure;
   comparing the first system data and the second system data to the plurality of computing system criteria of the first operational risk rule; and
   in response to determining that both the first system data and the second system data match the plurality of computing system criteria of the first operational risk rule, calculating and outputting one or more operational risk values for the aggregated computing infrastructure, based on the first operational risk rule.

2. The method of claim 1, further comprising:
   receiving a request for an operational risk report for the aggregated computing infrastructure from a first client device;
   authenticating a first authorized user associated with the request from the first client device;
   generating an operational risk report for the aggregated computing infrastructure, wherein contents of the operational risk report are based on operational risk data access permissions associated with the first authorized user; and
   transmitting the operational risk report for the aggregated computing infrastructure to the first client device.

3. The method of claim 1, wherein the data store comprises a database configured to store operational risk rules, and wherein each operational risk rule stored in the database comprises one or more criteria for evaluating the operational risk rule, a probability value, and a severity value.

4. The method of claim 3, wherein evaluating the first operational risk rule comprises:
   retrieving the first operational risk rule from the database;
   comparing one or more criteria of the first operational risk rule to the data extracted from the received first and second data bundles; and
   based on the comparison, determining whether or not the aggregated computing infrastructure satisfies the first operational risk rule.

5. The method of claim 4, wherein calculating the one or more operational risk values for the aggregated computing infrastructure comprises:
   upon determining that the aggregated computing infrastructure satisfies the first operational risk rule, retrieving a probability value and a severity value associated with the first operational risk rule; and
   calculating a first operational risk value associated with the first operational risk rule for the aggregated computing infrastructure, using the probability value and the severity value associated with the first operational risk rule.

6. The method of claim 4, further comprising:
   upon determining that the aggregated computing infrastructure satisfies the first operational risk rule, retrieving a set of remedial actions associated with the first operational risk rule;

generating an operational risk report for the aggregated computing infrastructure, the operational risk report including at least the set of remedial actions associated with the first operational risk rule.

7. The method of claim 1, wherein receiving the first and second data bundles comprises:
determining first decoding and decrypting techniques for the first data bundle based on the first computing system;
receiving a second data bundle from a second component of the aggregated computing infrastructure, the second data bundle encoded and encrypted using second encoding and encrypting techniques different from the first encoding and encrypting techniques; and
determining second decoding and decrypting techniques for the second data bundle based on the second computing system, wherein the second encoding and encrypting techniques used to encode and encrypt the second data bundle are different from the first encoding and encrypting techniques used to encode and encrypt the first data bundle.

8. The method of claim 1, wherein:
the aggregated computing infrastructure comprises one or more storage devices, one or more computer servers, one or more virtual machine servers, one or more operating systems, one or more database servers, one or more middleware applications, and one or more user software applications, and
receiving the first and second data bundles comprises receiving a data bundle from two or more different components within the aggregated computing infrastructure.

9. The method of claim 1, wherein the first computing system and the second computing do not communicate directly within the aggregated computing infrastructure.

10. The method of claim 1, wherein calculating and outputting the operational risk values based on the first operational risk rule comprises determining an operational risk affecting the first computing system but not the second computing system.

11. The method of claim 1, wherein calculating and outputting the operational risk values based on the first operational risk rule comprises determining an operational risk affecting a third computing system within the aggregated computing infrastructure, but not affecting either of the first computing system or the second computing system.

12. The method of claim 1, further comprising:
receiving an updated first operational risk rule from the data store;
in response to receiving the updated first operational risk rule from the data store:
initiating a first request to the first computing system for an updated first data bundle including data representing an updated operational status of the first computing system within the aggregated computing infrastructure; and
initiating a second request to the second computing system for an updated second data bundle including data representing an updated operational status of the second computing system within the aggregated computing infrastructure.

13. A system comprising:
a processing unit comprising one or more processors; and
memory coupled with and readable by the processing unit and storing therein a set of instructions which, when executed by the processing unit, causes the processing unit to calculate operational risk values for an aggregated computing infrastructure by:
receiving a first data bundle from a first computing system operating in an aggregated computing infrastructure, the first data bundle including data representing the operational status of the first computing system within the aggregated computing infrastructure;
receiving a second data bundle from a second computing system operating in the aggregated computing infrastructure, the second data bundle including data representing the operational status of the second computing system within the aggregated computing infrastructure, wherein the second computing system operates separately and independently from the first computing system;
retrieving one or more operational risk rules associated with aggregated computing infrastructures, from a data store, each said operational risk rule including a plurality of criteria stored in the data store;
evaluating a first operational risk rule, by:
determining a set of criteria of the first operational risk rule, the criteria including a plurality of computing system criteria, each of the computing system criteria identifying a specific hardware device model or a specific software application version;
extracting first system data from the first data bundle, the first system data identifying at least one of a first specific hardware device model or a first specific software application version of the first computer system in the aggregated computing infrastructure;
extracting second system data from the second data bundle, the second system data identifying at least one of a second specific hardware device model or a second specific software application version of the second computer system in the aggregated computing infrastructure;
comparing the first system data and the second system data to the plurality of computing system criteria of the first operational risk rule; and
in response to determining that both the first system data and the second system data match the plurality of computing system criteria of the first values for the aggregated computing infrastructure, based on the first operational risk rule.

14. The system of claim 13, wherein the data store comprises a database configured to store operational risk rules, and wherein each operational risk rule stored in the database comprises one or more criteria for evaluating the operational risk rule, a probability value, and a severity value.

15. The system of claim 14, wherein evaluating the first operational risk rule comprises:
retrieving the first operational risk rule from the database;
comparing one or more criteria of the first operational risk rule to the data extracted from the received first and second data bundles; and
based on the comparison, determining whether or not the aggregated computing infrastructure satisfies the first operational risk rule.

16. The system of claim 15, wherein calculating the one or more operational risk values for the aggregated computing infrastructure comprises:
upon determining that the aggregated computing infrastructure satisfies the first operational risk rule, retrieving a probability value and a severity value associated with the first operational risk rule; and calculating a first operational risk value associated with the first operational risk rule for the aggregated computing infrastructure, using the probability value and the severity value associated with the first operational risk rule.

17. A computer-readable memory comprising a set of instructions stored therein which, when executed by a processor, causes the processor to calculate operational risk values for an aggregated computing infrastructure by:

receiving a first data bundle from a first computing system operating in an aggregated computing infrastructure, the first data bundle including data representing the operational status of the first computing system within the aggregated computing infrastructure;

receiving a second date bundle from a second computing system operating in the aggregated computing infrastructure, the second data bundle including data representing the operational status of the second computing system within the aggregated computing infrastructure, wherein the second computing system operates separately and independently from the first computing system;

retrieving one or more operational risk rules associated with aggregated computing infrastructures, from a data store, each said operational risk rule including a plurality of criteria stored in the data store;

evaluating a first operational risk rule, by:
 determining a set of criteria of the operational risk rule, the criteria including a plurality of computing system criteria, each of the computing system criteria identifying a specific hardware device model or a specific software application version;
 extracting first system data from the first data bundle, the first system data identifying at least one of a first specific hardware device model or a first specific software application version of the first computer system in the aggregated computing infrastructure;
 extracting second system data from the second data bundle, the second system data identifying at least one of a second specific hardware device model or a second specific software application version of the second computer system in the aggregated computing infrastructure;
 comparing the first system data and the second system data to the plurality of computing system criteria of the first operational risk rule; and
 in response to determining that both the first system data and the second system data match the plurality of computing system criteria of the first operational risk rule, calculating and outputting one or more operational risk values for the aggregated computing infrastructure, based on the first operational risk rule.

18. The computer-readable memory of claim 17, wherein the data store comprises a database configured to store operational risk rules, and wherein each operational risk rule stored in the database comprises one or more criteria for evaluating the operational risk rule, a probability value, and a severity value.

19. The computer-readable memory of claim 18, wherein evaluating the first operational risk rule comprises:
 retrieving the first operational risk rule from the database;
 comparing one or more criteria of the first operational risk rule to the data extracted from the received first and second data bundles; and
 based on the comparison, determining whether or not the aggregated computing infrastructure satisfies the first operational risk rule.

20. The computer-readable memory of claim 19, wherein calculating the one or more operational risk values for the aggregated computing infrastructure comprises:
 upon determining that the aggregated computing infrastructure satisfies the first operational risk rule, retrieving a probability value and a severity value associated with the first operational risk rule; and
 calculating a first operational risk value associated with the first operational risk rule for the aggregated computing infrastructure, using the probability value and the severity value associated with the first operational risk rule.

* * * * *

UNITED STATES PATENT AND TRADEMARK OFFICE
CERTIFICATE OF CORRECTION

PATENT NO. : 9,900,299 B2
APPLICATION NO. : 14/678434
DATED : February 20, 2018
INVENTOR(S) : Oppenheim, Jr. et al.

Page 1 of 1

It is certified that error appears in the above-identified patent and that said Letters Patent is hereby corrected as shown below:

In the Specification

In Column 5, Line 48, delete "infra-red" and insert -- infrared --, therefor.

In Column 20, Line 3, after "integrated" insert -- . --.

In the Claims

In Column 32, Line 46, before "values" insert -- operational risk rule, calculating and outputting one or more operational risk --.

Signed and Sealed this
Sixth Day of November, 2018

Andrei Iancu
*Director of the United States Patent and Trademark Office*